United States Patent [19]

Fujii et al.

[11] Patent Number: 4,620,876
[45] Date of Patent: Nov. 4, 1986

[54] AQUEOUS INK FOR INK-JET PRINTING

[75] Inventors: Tadashi Fujii, Yokohama; Kakuji Murakami, Kawasaki; Eiichi Akutsu, Ichikawa; Tamotsu Aruga, Kamakura, all of Japan

[73] Assignee: Ricoh Company, Ltd., Tokyo, Japan

[21] Appl. No.: 790,648

[22] Filed: Oct. 24, 1985

Related U.S. Application Data

[63] Continuation of Ser. No. 518,513, Jul. 29, 1983, abandoned.

[30] Foreign Application Priority Data

Aug. 23, 1982 [JP] Japan ................... 57-144608

[51] Int. Cl.$^4$ ............................................. C09D 11/02
[52] U.S. Cl. .......................................... 106/22; 106/20
[58] Field of Search ................................ 106/22, 20

[56] References Cited

U.S. PATENT DOCUMENTS

| | | | |
|---|---|---|---|
| 4,239,543 | 12/1980 | Beasley | 106/22 |
| 4,269,627 | 5/1981 | Hwang | 106/22 |
| 4,352,691 | 10/1982 | Owatari et al. | 106/22 |
| 4,421,559 | 12/1983 | Owatari | 106/22 |

FOREIGN PATENT DOCUMENTS

| | | |
|---|---|---|
| 0006606 | 1/1979 | Japan . |
| 57-115468 | 7/1982 | Japan . |

OTHER PUBLICATIONS

*Chemical Abstract*, vol. 98, 1983, Abstract No. 109052t, Orient Chemical Industries, Ltd., "Water–Based Inks", Jul. 17, 1982.

*Primary Examiner*—Paul Lieberman
*Assistant Examiner*—Hoa Van Le
*Attorney, Agent, or Firm*—Flynn, Thiel, Boutell & Tanis

[57] ABSTRACT

An aqueous ink for ink-jet printing comprising at least a water-soluble dye, a water-soluble organic solvent, a water-soluble preservative and anti-mold agent, and water, wherein (1) the water-soluble dye is a mixture of dye compounds I and II and/or III, the peak ratio of I/II and/or III of the water-soluble dye measured by liquid chromatography is in the range of 0.9 to 3.0; the total concentration of NaCl and $Na_2SO_4$ contained in the water-soluble dye is 3.0 wt. % or less; and the concentration of Ca contained therein is 120 ppm or less;

(2) the water-soluble organic solvent is a mixture consisting essentially of glycerin and at least one glycol selected from the group consisting of ethylene glycol, diethylene glycol, triethylene glycol, tetraethylene glycol and polyethylene glycol, with the content ratio of (the glycerin:the glycol) being in the range of (1:1) to (1:5) in terms of parts by weight, and the concentration of the water-soluble organic solvent in the aqueous ink is in the range of 10 wt. % to 30 wt. %; and (3) the surface tension of said aqueous ink is 50 dynes/cm or more.

8 Claims, No Drawings ical electric conductivity, and density each fall
AQUEOUS INK FOR INK-JET PRINTING This application is a continuation of U.S. Ser. No. 518,513 filed July 29, 1983, now abandoned.

BACKGROUND OF THE INVENTION

The present invention relates to an improved aqueous ink for ink-jet printing.

Generally, ink for use in ink-jet printing should satisfy several conditions in order to yield an excellent print, and there has been a keen demand for an aqueous ink which satisfies the following conditions:

First, in order that the ink be compatible with ink droplet formation and control of the direction of the ejected ink droplet streams, its viscosity, surface tension, specific electric conductivity, and density each fall within certain appropriate ranges. No precipitates are separated, due to chemical change or other causes, from the ink during an extended period of storage, or during the periods when the apparatus is not in use. No physical properties of the ink otherwise change during the above-mentioned periods. This is because, if the nozzles are plugged, for instance, with precipitates separated from the ink, it becomes impossible to eject the ink droplets from the nozzles, and even if the nozzles are not completely plugged, if solid components or viscous materials in the ink become affixed around the nozzles, or if the physical properties of the ink change, deviating from the predetermined physical properties achieved at the time of the preparation, the desired printing quality, the desired ink ejection stability, and the desired ink ejection response cannot be obtained.

Second, the ink provides adequately high contrast and clearness in the printed images.

Third, the images printed by the ink dries rapidly.

Fourth, the ink for ink-jet printing is such that the printed images are resistant to water, light and physical wear.

Fifth, the ink does not attack or corrode the container, tube, sealing materials, nozzles and valves and other parts of the ink-jet printing apparatus which come into contact with the ink.

Sixth, the ink is non-toxic to human bodies, free from unpleasant odor, and is non-inflammable.

As the conventional inks for ink-jet printing, C.I. Direct Black type dyes are widely used. However, when, for instance, C.I. Direct Black 19, which is one of the commercially available C.I. Direct Black-type dyes, is employed directly as the aqueous ink, it is not capable of meeting the above-described requirements.

More specifically, in the case of a conventional ink which is prepared by dissolving C.I. Direct Black 19 in an aqueous solvent, precipitates are separated, due to chemical change or other causes, from the ink during an extended period of storage, or during the periods when the ink-jet printing apparatus is not in use. As a result, the nozzles are plugged with the precipitates and it becomes impossible to eject the ink droplets from the nozzles.

Furthermore, since the solubility of C.I. Direct Black 19 in the solvent employed in the ink is low, the concentration of the dye cannot be increased. The result is that the ink cannot provide images with high density and high contrast.

In a conventional ink for ink-jet printing, in order to prevent the ink from drying within the nozzles when printing is not actually taking place, a comparatively large amount of a humectant is contained in the ink. This results in decreasing of the drying speed of the printed images.

In Japanese laid-open patent application No. 51-85804, there is proposed an ink for ink-jet printing, in which a chelating agent is contained in order to prevent accumulation of water-insoluble calcium salts in the nozzles, which causes the plugging of the nozzles. This chelating agent, however, brings about another problem that the chelating agent corrodes the metallic materials employed in the ink supply system of the ink-jet printing apparatus. Therefore, that ink is not suitable for practical use.

In Japanese laid-open patent application No. 54-120007, there is proposed an improved ink for ink-jet printing, in which a rust preventing agent is further contained in combination with the chelating agent disclosed in the above Japanese laid-open patent application No. 51-85804, in order to prevent the corrosion of the metallic materials employed in the ink supply system. However, the rust-preventing effect of the rust preventing agent is insufficient for practical use. In other words, the rust preventing agent is not capable of completely preventing the corrosion of the metallic materials. Further, the rust preventing agent precipitates and accumulates around the nozzles during the periods when the apparatus is not in use, and by the accumulated precipitates, the ink ejection direction is caused to considerably deviate from the desired direction.

Inks for ink-jet printing, containing a trisazo compound or a tetraazo compound, are also proposed. However, they are not suitable for practical use because of the poor solubility of those compounds in the solvent of the inks and because of incapability of yielding black images.

In addition to the above, so far, many proposals have been made for an ink for ink-jet printing, but from the viewpoint of practical use, a satisfactory ink which is capable of meeting the above-described requirements has not been found.

SUMMARY OF THE INVENTION

It is therefore an object of the present invention to provide an aqueous ink for ink-jet printing completely satisfying the above outlined conditions. That is to say, the object of the present invention is to provide an aqueous ink for ink-jet printing which does not result in plugging of the nozzles, does not change in quality or separate precipitates therefrom with time during storage, and does not attack or corrode any metallic materials employed in the ink supply system which come into contact with the ink, but exhibits excellent ink-ejection stability, and has good ink ejection response, shows slight changes in physical properties, if any, when used for a long period with continuous recirculation, or when used intermittently, and, yields printed images which are non-spreading, and have superior water resistance, high sharpness, and high image density.

Further, the aqueous ink according to the present invention is such that the printed images have high resolution, dry rapidly, and are resistant to water, light and physical wear. Furthermore, the aqueous ink is completely non-toxic to human bodies, free from unpleasant odor, and non-inflammable under normal conditions.

According to the present invention, the above object can be attained by an aqueous ink for ink-jet printing comprising as its main components a water-soluble dye, a water-soluble organic solvent, a water-soluble preservative and anti-mold agent, and water.

DETAILED DESCRIPTION OF THE PREFERRED EMBODIMENTS

The aqueous ink for ink-jet printing according to the present invention comprises as the main components a water-soluble dye, a water-soluble organic solvent, a water-soluble preservative and anti-mold agent, and water with the following particular requirements (1), (2) and (3):

(1) The water-soluble dye is a mixture of the following dye compounds I and II and/or III

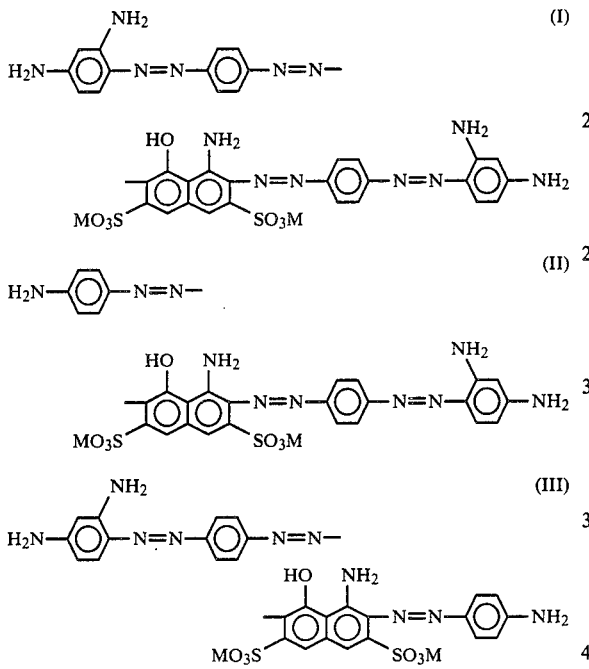

wherein M is an alkali metal.

(a) In the above water-soluble dye, the peak ratio of [I]/[II and/or III] measured by liquid chromatography is in the range of 0.9 to 3.0.

(b) With respect to NaCl, $Na_2SO_4$ and Ca contained in the water-soluble dye, the total concentration of NaCl and $Na_2SO_4$ is 3.0 wt. % or less, and the concentration of Ca is 120 ppm or less.

(2) The water-soluble organic solvent is a mixture consisting essentially of glycerin and at least one glycol selected from the group consisting of ethylene glycol, diethylene glycol, triethylene glycol, tetraethylene glycol and polyethylene glycol (with an average molecular weight ranging from 200 to 400) with the content ratio of (the glycerin:the glycol) being in the range of (1:1) to (1:5) in terms of parts by weight, and the concentration of the water-soluble organic solvent in the aqueous ink is in the range of 10 wt. % to 30 wt. %.

(3) The surface tension of the aqueous ink is 50 dynes/cm or more.

In the aqueous ink according to the present invention, it is an essential condition that the ink is a mixture of the dye compound I and the dye compound II and/or III. The mixture of those dye compounds can be prepared by synthesizing those dye compounds separately and then by mixing them. Alternatively, the mixture can be obtained by purifying a commercially available C.I. Direct Black 19, using the technique of recrystallization, reprecipitation, extraction or salting-out.

It is preferable that the concentration of the water-soluble dye be in the range of 1.5 wt. % to 4.0 wt. %.

When the concentration of the water-soluble dye is less than 1.5 wt. %, practically usable, high image density cannot be obtained, while when the concentration exceeds 4.0 wt. %, the ink is concentrated by evaporation, particularly near the nozzles, during the periods when the apparatus is not in use. As a result, the ink ejection direction is significantly changed, and the desired ink ejection stability and ink ejection response cannot be obtained. It is more preferable that the concentration of the water-soluble dye in the aqueous ink be in the range of 2.0 wt. % to 4.0 wt. %.

In the present invention, it is necessary that the water-soluble dye satisfy the previously mentioned requirement (a). In the case of C.I. Direct Black 19 dyes on the market, many of them have a peak ratio ranging from 0.7 to 4.5, which is defined in the requirement (a). For instance, the peak ratio of Water Black 200 L (commercially available from Orient Chemical Industrial Ltd.) varies from 0.7 to 2.0. By purifying the dye, an ink with the desired peak ratio ranging from 0.9 to 3.0 can be obtained.

The conditions for measurement of the peak ratio by liquid chromatography are as follows:

As a filler, silica gel is employed, and as the first eluent, a mixture of $CH_3COOH/CH_3OH$ is employed, and as the second eluent, a mixture of $CH_3OH/H_2O/(CH_3CH_2)_3N$ (with a gradient of 0% to 100%) is employed.

Further, it is necessary that the water-soluble dye meet the previously described requirement (b) that the total concentration of NaCl and $Na_2SO_4$ contained in the dye be 3.0 wt. % or less, and the concentration of Ca in the dye be 120 ppm or less.

In the case of commercially available water-soluble dyes, the total concentration of NaCl and $Na_2SO_4$ is in the range of 1 wt. % to 40 wt. %, and the concentration of Ca is in the range of 350 ppm to 2000 ppm.

According to the present invention, by controlling the total concentration of NaCl and $Na_2SO_4$ and the concentration of Ca in the respective above ranges, it is attained that no precipitates are separated from the ink during an extended period of storage, or during the periods when the apparatus is not in use, and the desired ink ejection stability and ink ejection response are obtained even after such non-use periods.

For decreasing the concentration of Ca in the water-soluble dye, there can be employed a method of treating the water-soluble dye with a chelate resin whose exchange group is an iminodiacetato-alkali-salt. It is preferable that the alkali metal contained in the iminodiacetato-alkali-salt be the same as that contained in the water-soluble dye.

In the present invention, it is important that the organic solvents that can employed are limited to those described in the requirement (2). For instance, when, as the organic solvent, glycerin is employed alone or in combination with a solvent other than the previously described solvents, the viscosity of the aqueous ink becomes too high for practical use or the solubility of the above described dye compounds in the solvent of the ink considerably decreases, so that images with high density cannot be obtained.

When the mixing ratio of glycerin and the polyhydric alcohol(s) exceeds the range described in the requirement (2), the solvent of the ink evaporates near the nozzles, so that the viscosity of the ink is exceedingly increased, or precipitates are separated from the ink. As a result, the direction of the ink droplet ejection becomes unstable.

Of the polyhydric alcohols mixed with glycerin, ethylene glycol, diethylene glycol and triethylene glycol are most preferable. When these polyhydric alcohols are employed, it is preferable that the mixing ratio of glycerin and any of the polyhydric alcohols be in the range of (1:2) to (1:4) in terms of parts by weight.

It is preferable that the surface tension of the aqueous ink according to the present invention be 50 dynes/cm or more. This can be attained by use of the above-described water-soluble dye. Further, by use of the above-described water-soluble dye, spreading of the images printed by this ink can be effectively prevented. As a matter of fact, decreasing the surface tension of the ink to less than 50 dynes/cm causes substantial spreading of the images.

It is preferable that the pH of the ink be in the range of 9.0 to 11.0 at room temperature. When the pH exceeds this range, the water-soluble dye is not dissolved in the solvent of the ink in a stable manner, and there occurs the corrosion of the portions of the ink-jet printing apparatus, made of ferrous metals, such as stainless steel, which come into contact with the ink. This results in unstable ink ejection.

The water-soluble dye for use in the present invention can be obtained, for example, by the following two methods:

The first method is to synthesize the dye compounds I, II and III separately with high purity and then to mix them in such a manner as to meet the above described requirements (a) and (b).

The second method is to purify the commercially available C.I. Direct Black 19, for instance, by recrystallization, re-precipitation, extraction or by a salting-out technique.

In the present invention, as water-soluble preservative and anti-mold agents, any materials can be used optionally from among many generally known chemicals, so far as they do not have adverse effects on the ink. For example, the following chemicals can be employed: 2-pyridinethiol-1-sodium oxide; organic nitrogen-sulfur compounds, such as Deltop A, Deltop 33 (commercially available from Takeda Chemical Industries, Ltd. and Watanabe Chemical Co., Ltd., Bioside 820, Bioside 880 (commercially available from Taisho Co., Ltd.), and Hokucide LX-2 (commercially available from Hokko Chemical Industry Co., Ltd.); 2,2-dimethyl-6-acetoxydioxane-1,3; sodium dehydroacetate; p-hydroxy benzoic acid butyl ester; and potassium sorbate.

Other additives can be employed as thought necessary in specific embodiments of an aqueous ink for ink-jet printing according to the present invention, or for use in specific apparatus. For examples, in addition to the previously mentioned glycerin and polyhydric alcohols, as water-soluble organic solvents, there can be employed cellosolve-type solvents such as polypropylene glycol and ethylene glycol monobutyl ether; carbitol-type solvents such as diethylene glycol monobutyl ether; triethylene glycol monomethyl ether and triethylene glycol monoethyl ether; nitrogen-containing heterocyclic type solvents such as triethanol amine, N-methyl-2-pyrrolidone, and 2-pyrrolidone; and carboxylic acid inter-molecular esters such as valerolactone and caprolactone.

In the present invention, as pH adjustment agents, for example, amines, such as diethanol amine and triethanolamine; hydroxides and carbonates of alkali metals (such as lithium, sodium and potassium); and ammonium hydroxide, can be employed.

When necessary, there can be employed other additives, for example, viscosity adjustment agents for adjusting the viscosity of the ink, such as water-soluble resins; rust preventing agents for the nozzles, such as sodium thiosulfate and ammonium thioglycolate; anti-foaming agents; ultraviolet-ray-absorbing agents; antioxidants; infrared-ray-absorbing agents; surface active agents; and magnetic fluids.

Preferred embodiments of an aqueous ink for ink-jet printing according to the present invention will now be explained, together with comparative examples thereof.

EXAMPLE 1

(1) Preparation of Dye Compound I

Sodium 1-amino-8-naphthol-3,6-disulfonate was reacted with p-nitrobenzene diazonium salt in an aqueous solution of hydrochloric acid to form 8-amino-2,7-bis(4-nitrophenylazo)-1-naphthol-3,6-disulfonic acid (hereinafter referred to as the bisazo compound I). The thus formed bisazo compound I was reduced by $Na_2S$, so that two nitro groups connected to the benzene rings in the bisazo compound I were converted to amino groups. The bisazo compound I with the amino groups was then reacted with $NaNO_2$ to form a corresponding diazonium salt of the bisazo compound I. This diazonium salt was then reacted with m-phenylenediamine, whereby the dye compound I of the following formula was prepared.

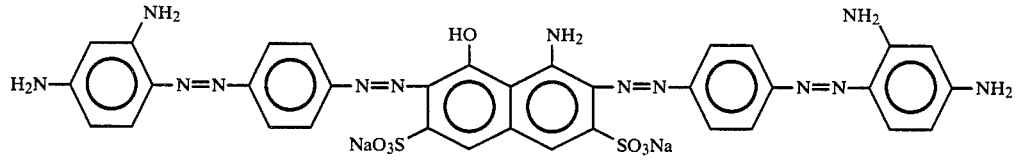

The product was caused to separate out from an acidic solution, filtered off, washed with water and dried, so that the dye compound I was obtained in the form of powder.

(2) Preparation of Dye Compound II

Sodium 1-amino-8-naphthol-3,6-disulfonate was reacted with p-nitrobenzene diazonium salt in an aqueous solution of hydrochloric acid to form 8-amino-7-(4-nitrophenylazo)-1-naphthol-3,6-disulfonic acid (hereinafter referred to as the monoazo compound I). The thus formed monoazo compound I was reduced by $Na_2S$, so that a nitro group connected to the benzene ring in the monoazo compound I was converted to an amino group. The monoazo compound I with the amino group was then subjected to diazotization by reacting the monoazo compound I with NaNO₂ in an aqueous solution of hydrochloric acid to form a corresponding diazonium salt of the monoazo compound I. This diazonium salt was then reacted with m-phenylenediamine to form a corresponding bisazo compound (hereinafter referred to as the bisazo compound II). The thus formed bisazo compound II was reacted with p-acetoaminobenzene diazonium salt in the presence of an alkali. The reaction product was hydrolyzed in water under application of heat thereto, whereby a dye compound II of the following formula was prepared:

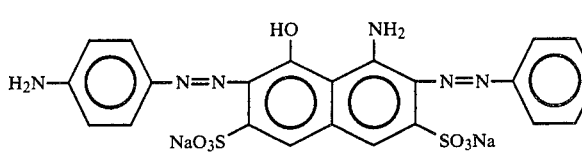 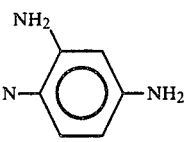

The product was caused to separate out from an acidic solution, filtered off, washed with water and dried, so that the dye compound II was obtained in the form of powder.

In the synthesis of the dye compounds I and II, water and the inorganic compound, which were purified by use of a cationic ion-exchange resin, were employed.

When preparing the aqueous ink, those dye compounds were used in the form of sodium salts by use of NaOH.

The concentration of the inorganic salts contained in each dye compound was determined to be 0.8 wt. % or less by an ion-electrode method, a titration method and colorimetry.

The concentration of Ca contained in each dye compound was determined to be 100 ppm or less by atomic absorption analysis and a plazma emission method.

(3) Embodiment No. 1 of an aqueous ink for ink-jet printing according to the present invention A mixture of the following components was heated to 70° C., stirred until completely dissolved, which took two hours, and then cooled to room temperature. The mixture was filtered through a membrane filter with a 0.2 μm mesh to yield an embodiment No. 1 of an aqueous ink for ink-jet printing according to the present invention:

| | wt. % |
|---|---|
| Dye Compound I | 2.0 |
| Dye Compound II | 1.0 |
| Glycerin | 5.0 |
| Diethylene glycol | 15.0 |
| Bioside 880 (commercially available from Taisho Co., Ltd.) | 0.3 |
| NaOH | Trace amount |
| Ion-exchanged water | Balance amount |

The properties of the thus prepared aqueous ink No. 1 were:

| pH | 10.5 | (23° C.) |
|---|---|---|
| Surface tension | = 63.0 dynes/cm | (23° C.) |
| Viscosity | = 1.6 cP | (30° C.) |
| Specific electric conductivity | = 3.0 mΩ$^{-1}$/cm | (23° C.) |

| -continued | |
|---|---|
| Concentration of Ca | = 3.3 ppm |

The aqueous ink No. 1 was then subjected to the following reliablity tests:

(1) Image Clarity and Image Dryness Test

The ink was caused to issue from a nozzle with an inner diameter of 30 μm, with vibrations at a frequency of 100 KHz, by which vibrations the ink was ejected in a stream broken into individual drops, and was then caused to impinge on commercially available high quality paper. As a result, clear images were obtained on the paper. The time required for drying the printed image was not more than 10 seconds at normal room temperature and humidity.

(2) Preservability Tests

Samples of the ink were tightly sealed in glass containers and subjected to the following storage tests:
a. Preserved for 3 months at −20° C.;
b. Preserved for 3 months at 4° C.; and
c. Preserved for 1 week at 90° C.

Separation of precipitates from the ink was not observed at all in storage. In addition, no changes were detected in the properties or color of the ink.

(3) Ink Droplet Ejection Stability Test

The ink-jet printing as was done in the above described Image Clarity and Image Dryness Test was continuously performed for 2,000 hours. There was no evidence of either clogging of the nozzle or change in ejection direction of the ink droplets; rather, stable printing was maintained.

(4) Ink Droplet Ejection Response Test

After ink-jet printing was performed as outlined in (1), the apparatus and ink were allowed to stand for two months at room temperature and humidity, after which they were used again to perform ink-jet printing under the same conditions as previously stated in (1). As in (3) above, there was no change in the ink droplet ejection stability.

The above test was repeated in the same manner, except that the apparatus and ink were allowed to stand for two weeks at 40° C., 30% RH, instead of being allowed to stand for one month at room temperature and humidity. The result was that again no change was observed in the ink droplet ejection stability.

(5) Stability Tests for Parts in Contact with the Ink

Test pieces of Stainless Steel SUS303 and SUS304 were immersed in the ink and preserved at 50° C. for 3 months. As a result, neither separation of the precipitates from the ink, nor changes in the properties of the ink were observed at all in storage. Further, no changes were detected in the concentrations of iron, chrome and nickel in the ink. No corrosion was observed in the test pieces of the Stainless Steel SUS303 and SUS304.

The above test was repeated in the same manner, except that the above stainless steel test pieces were immersed in the ink at 90° C. for one week, instead of being immersed in the ink at 50° C. for 3 months. The result was that again no separation of precipitates from the ink was observed at all and no changes were detected in the properties of the ink. Further, there were no changes in the concentrations of iron, chrome and nickel in the ink. No corrosion was observed in the stainless steel test pieces.

EXAMPLE 2

(1) Preparation of Dye Compound III 8-amino-7-(4-nitrophenylazo)-1-naphthol-3,6-disulfonic acid was reacted with p-acetoaminobenzene diazonium salt in an alkaline solution to form 8-amino-7-(4-nitrophenylazo)-2-(4-aminophenylazo)-1-naphthol-3,6-disulfonic acid. This bisazo compound was subjected to diazotization by reacting with $NaNO_2$. The thus formed diazonium salt of the 8-amino-7-(4-nitrophenylazo)-2-(4-aminophenylazo)-1-naphthol-3,6-disulfonic acid was coupled with m-phenylenediamine. The thus formed azo compound was then reduced by $Na_2S$, so that a nitro group connected to the benzene ring in the azo compound III was converted to an amino group, whereby a dye compound III of the following formula was prepared.

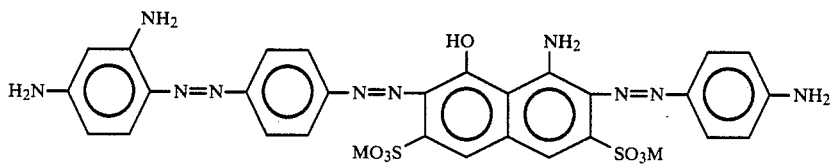

The product was caused to separate out from an acidic solution, filtered off, washed with water and dried, so that the dye compound III was obtained in the form of powder.

In the synthesis of the dye compound III, water and the in organic compound, which were purified by use of a cationic iron exchange resin, were employed.

When preparing an embodiment No. 2 of an aqueous ink according to the present invention, the dye compound I prepared in Example 1 and the above dye compound III were used in the form of lithium salts by use of LiOH.

The concentration of the inorganic salts contained in the dye compound III was determined by the same methods as those described in Example 1. The result was that the concentration of the inorganic salt was 0.6 wt. % or less.

The concentration of Ca contained in the dye compound III was also determined by the same methods as those described in Example 1 and the result was that the concentration of Ca was 100 ppm or less.

(2) Embodiment No. 2 of an aqueous ink for ink-jet printing according to the present invention Example 1 was repeated except that the dye compound II employed in Example 1 was replaced by the dye compound III, whereby an embodiment No. 2 of an aqueous ink according to the present invention was prepared. The properties of thus prepared ink were as follows:

| | | |
|---|---|---|
| pH | 10.5 | (21° C.) |
| Surface tension | = 62.0 dynes/cm | (21° C.) |
| Viscosity | = 1.6 cP | (30° C.) |
| Specific electric conductivity | = 3.2 m$\Omega^{-1}$/cm | (21° C.) |
| Concentration of calcium | 3.0 ppm | |

The aqueous ink No. 2 was then subjected to the same reliability tests as those in Example 1. The results were as good as in Example 1 in all the tests.

EXAMPLE 3

(1) Purification of a commercially available C. I. Direct Black 19

A commercially available C. I. Direct Black 19 (Trade Name: Water Black 100L made by Orient Chemical Industrial Ltd.) was purified by treating an aqueous solution of the C. I. Direct Black 19 with a chelate resin whose exchange group was sodium iminodiacetate and was then subjected to salting-out by $CH_3COOH$ and then to methanol extraction.

The concentration of the inorganic salts contained in the dye powder was measured by the same methods as in Example 1 and the result was that the concentration was 1.8 wt. % or less. The concentration of calcium contained in the dye was 75 ppm. The peak ratio of the dye measured by the liquid chromatography was 1.7.

(2) Embodiment No. 3 of an aqueous ink for ink-jet printing according to the present invention With the following formulation, an embodiment No. 3 of an aqueous ink according to the present invention was prepared by the same procedure as in Example 1.

| | wt. % |
|---|---|
| The above purified C. I. Direct Black 19 | 2.5 |
| Glycerin | 6.0 |
| Triethylene glycol | 14.0 |
| Hokucide LX-2 (commercially available from Hokko Chemical Industry Co., Ltd.) | 0.3 |
| Ion-exchanged water | 77.2 |

The properties of the thus prepared ink were as follows:

| | | |
|---|---|---|
| pH | = 9.9 | (23° C.) |
| Surface tension | = 51 dynes/cm | (23° C.) |
| Viscosity | = 1.8 cP | (30° C.) |
| Specific electric conductivity | = 2.9 m$\Omega^{-1}$/cm | (23° C.) |
| Concentration of Ca | = 2.3 ppm | |

The ink was then subjected to the same reliability tests as those in Example 1. The results of those tests were as good as in Example 1 in all the tests.

EXAMPLE 4

(1) Purification of a commercially available C. I. Direct Black 19

A commercially available C. I. Direct Black 19 (Trade Name: Water Black 200L made by Orient Chemical Industrial Ltd.) was purified by treating an aqueous solution of the C. I. Direct Black 19 with the same chelate resin as that employed in Example 3 and was then subjected to ultrafiltration and then to re-precipitation by a mixture of water and acetone in the ratio of 1:19 in terms of parts by weight. The concentration of the inorganic salts contained in the dye powder was measured by the same methods as in Example 1. The result was that the concentration of the inorganic salts was 2.3 wt. % or less. The concentration of calcium contained in the dye was 70 ppm.

The peak ratio of the dye measured by the liquid chromatography was 1.7.

(2) Embodiment No. 4 of an aqueous ink for ink-jet printing according to the present invention With the following formulation, an embodiment No. 4 of an aqueous ink according to the present invention was prepared by the same procedure as in Example 1.

|  | wt. % |
| --- | --- |
| The above purified C. I. Direct Black 19 | 2.5 |
| Glycerin | 6.0 |
| Triethylene glycol | 14.0 |
| Hokucide LX-2 (commercially available from Hokko Chemical Industry Co., Ltd.) | 0.3 |
| Ion-exchanged water | 77.2 |

The properties of the thus prepared ink were as follows:

| pH | = 10.2 | (23° C.) |
| --- | --- | --- |
| Surface tension | = 61.0 dynes/cm | (23° C.) |
| Viscosity | = 1.8 cP | (30° C.) |
| Specific electric conductivity | = 2.4 m$\Omega^{-1}$/cm | (23° C.) |
| Concentration of Ca | = 2.3 ppm | |

The ink was then subjected to the same reliability tests as those in Example 1. The results of those tests were as good as in Example 1 in all the tests.

EXAMPLE 5

(1) Purification of a commercially available C. I. Direct Black 19

A commercially available C. I. Direct Black 19 (Trade Name: Daiwa Black 6000H made by Daiwa Dyestuff Mfg. Company, Ltd.) was purified by treating an aqueous solution of the C.I. Direct Black 19 with the same chelate resin as that employed in Example 3 and was then subjected to separation from an acidic solution, filtration, washing with water and drying. Thereafter, the dye was converted to the potassium salt by KOH and was then subjected to methanol extraction.

The concentration of the inorganic salts contained in the dye powder was measured by the same methods as in Example 1. The result was that the concentration of the inorganic salts was 1.3 wt. % or less. The concentration of calcium contained in the dye was 70 ppm.

The peak ratio of the dye measured by the liquid chromatography was 0.9.

(2) Embodiment No. 5 of an aqueous ink for ink-jet printing according to the present invention With the following formulation, an embodiment No. 5 of an aqueous ink according to the present invention was prepared by the same procedure as in Example 1.

|  | wt. % |
| --- | --- |
| The above purified C. I. Direct Black 19 | 2.5 |
| Glycerin | 3.8 |
| Triethylene glycol | 11.2 |
| Sodium dehydro acetate | 0.6 |
| KOH | Trace amount |
| Ion-exchanged water | Balance amount |

The properties of the thus prepared ink were as follows;

| pH | = 10.5 | (23° C.) |
| --- | --- | --- |
| Surface tension | = 61.0 dynes/cm | (23° C.) |
| Viscosity | = 1.6 cP | (30° C.) |
| Specific electric conductivity | = 3.1 m$\Omega^{-1}$/cm | (23° C.) |
| Concentration of Ca | = 2.3 ppm | |

The ink was then subjected to the same reliability tests as those in Example 1. The results of those tests were as good as in Example 1 in all the tests.

EXAMPLE 6

(1) Purification of a commercially available C. I. Direct Black 19

A commercially available C. I. Direct Black 19 (Trade Name: Daiwa Black 320H made by Daiwa Dyestuff Mfg. Company, Ltd.) was purified by treating an aqueous solution of the C. I. Indirect Black 19 with the same chelate resin as that employed in Example 3 and was then subjected to ultrafiltration and then to benzyl alcohol extraction.

The concentration of the inorganic salts contained in the dye powder was measured by the same methods as in Example 1. The result was that the concentration of the inorganic salts was 1.4 wt. % or less. The concentration of calcium contained in the dye was 80 ppm or less.

The peak ratio of the dye measured by the liquid chromatography was 2.2.

(2) Embodiment No. 6 of an aqueous ink for ink-jet printing according to the present invention With the following formulation, an embodiment No. 6 of an aqueous ink according to the present invention was prepared by the same procedure as in Example 1.

|  | wt. % |
| --- | --- |
| The above purified C. I. Direct Black 19 | 2.5 |
| Glycerin | 5.0 |
| Diethylene glycol | 15.0 |
| 2-pyridinethiol-1-sodium oxide (Trade name: Sodium Omadine made by Olin Corporation) | 0.3 |
| NaOH | Trace amount |
| Ion-exchanged water | Balance amount |

The properties of the thus prepared ink were as follows:

| | | |
|---|---|---|
| pH | = 10.5 | (26° C.) |
| Surface tension | = 61.0 dynes/cm | (26° C.) |
| Viscosity | = 1.8 cP | (30° C.) |
| Specific electric conductivity | = 3.3 m$\Omega^{-1}$/cm | (26° C.) |
| Concentration of Ca | = 2.0 ppm | |

The ink was then subjected to the same reliability tests as those in Example 1. The results of those tests were as good as in Example 1 in all the tests.

COMPARATIVE EXAMPLE 1

(1) The concentration of the inorganic salts contained in a commercially available Direct Black 19 (Trade name: Water Black 100L made by Orient Chemical Industrial Ltd.) was measured in the same manner as in Example 1. The result was that the concentration of the inorganic salts was 3.0 wt. % or less. The concentration of Ca was 800 ppm.

The peak ratio of this dye measured by liquid chromatography was 0.7.

(2) Preparation of Comparative Aqueous Ink No. 1

With the following formulation, a comparative aqueous ink No. 1 was prepared by the same procedure as in Example 1.

| | wt. % |
|---|---|
| The above non-purified C. I. Direct Black 19 | 3.3 |
| Polyethylene glycol 200 | 20.0 |
| 2-pyridinethiol-1-sodium oxide | 0.3 |
| NaOH | Trace amount |
| Ion-exchanged water | Balance amount |

The properties of the thus prepared ink were as follows:

| | | |
|---|---|---|
| pH | = 10.5 | (26° C.) |
| Surface tension | = 49.0 dynes/cm | (26° C.) |
| Viscosity | = 1.9 cP | (30° C.) |
| Specific electric conductivity | = 2.5 m$\Omega^{-1}$/cm | (26° C.) |
| Concentration of Ca | = 25 ppm | |

The ink was then subjected to the following reliability:

(1) Image clarify and Image Dryness Test

As in Example 1, the ink was caused to issue from a nozzle with an inner diameter of 30 μm, with vibrations at a frequency of 100 KHz, by which vibrations the ink was ejected in a stream broken into individual drops, and was then caused to impinge on commercially available high quality paper. The results were almost the same as in Example 1 through Example 6.

(2) Preservability Tests

Samples of the ink were tightly sealed in glass containers and subjected to the following storage tests
a. Preserved for one week at −20° C.;
b. Preserved for one week at 4° C.;
Considerable separation of black precipitates from the ink was observed in the above two preservability tests. In addition, calcium was detected with high concentration in the black precipitates.

(3) Ink Droplet Ejection Stability Test

The ink-jet printing as was done in the above described Image Clarity and Image Dryness Test was continuously performed for 400 hours. As a result, there was observed a considerable change in the ejection direction of the ink droplets and stable recording was not done any longer. There were observed black precipitates and particle-like precipitates affixed around the nozzles. Calcium was detected with high concentration in the particle-like precipitates.

(4) Ink Droplet Ejection Response Tests

After ink-jet printing was performed as outlined in (1), the apparatus and ink were allowed to stand for 4 days at room temperature and humidity, after which they were used again to perform ink-jet printing under the same conditions as previously stated in (1). As in (3) above, there was observed a considerable change in the direction of the ink droplet ejection.

The above test was repeated in the same manner, except that the apparatus and ink were allowed to stand for one day at 40° C., 30% RH, instead of being allowed to stand for 4 days at room temperature and humidity. The result was that again a considerable change was observed in the direction of the ink droplet ejection, and stable recording was not done any longer.

(5) Stability Tests for Parts in Contact with the Ink

The stability tests were conducted in the same manner as in Example 1. The results were as good as in Example 1 through Example 6.

COMPARATIVE EXAMPLE 2

(1) The concentration of the inorganic salts contained in a commercially available Direct Black 10 (Trade name:Daiwa Black 6000H made by Daiwa Dyestuff Mfg Company, Ltd.) was measured in the same manner as in Example 1. The result was that the concentration of the inorganic salts was 1.0 wt. % or less. The concentration of Ca was 340 ppm.

The peak ratio of this dye measured by the liquid chromatography was 0.7.

(2) Preparation of Comparative Aqueous Ink No. 2

With the following formulation, a comparative aqueous ink No. 2 was prepared by the same procedure as in Example 1.

| | wt. % |
|---|---|
| The above C. I. Direct Black 19 | 2.5 |
| Polyethylene glycol | 15.0 |
| N—methyl-2-pyrrolidone | 3.0 |
| 2-pyridinethiol-1-sodium oxide | 0.3 |
| NaOH | Trace amount |
| Ion-exchanged water | Balance amount |

The properties of the thus prepared ink were as follows:

| | | |
|---|---|---|
| pH | = 10.5 | (26° C.) |
| Surface tension | = 59.0 dynes/cm | (26° C.) |
| Viscosity | = 1.8 cP | (30° C.) |
| Specific electric conductivity | = 3.1 m$\Omega^{-1}$/cm | (26° C.) |

| Concentration of Ca | = | 7.7 ppm |

The ink was then subjected to the same reliability tests as those in Comparative Example 1, The results of those tests were almost the same as in Comparative Example 1. More specifically, with respect to (1) the image clarity and image dryness test and (2) the stability tests for parts in contact with the ink (5), the results were as good as in Examples 1 through 6, whereas, with respect to (2) the preservability test, (3) the ink droplet ejection stability test and (4) the ink droplet ejection response test, the results were as poor as in Comparative Example 1.

What is claimed is:

1. An aqueous ink for ink-jet printing comprising an aqueous solution of a water-soluble dye and a water-soluble organic solvent, wherein
   (1) said water-soluble dye is a mixture of (a) a compound having the formula I and (b) a compound having the formula II, a compound having the formula III or a mixture of compounds having the formulas II and III

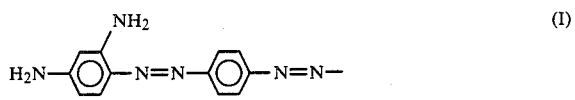

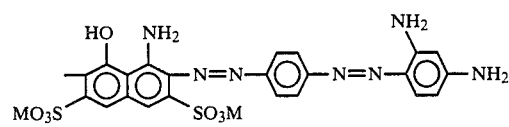

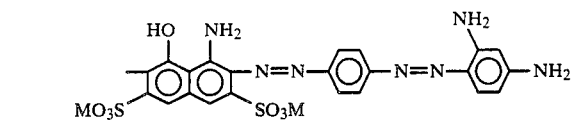

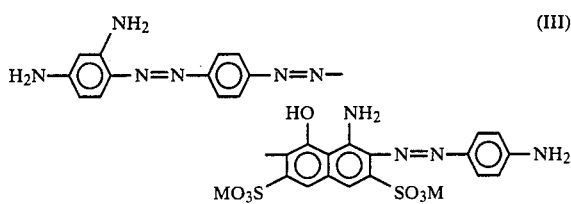

wherein M is an alkali metal; the peak ratio of (a)/(b) of said water-soluble dye, measured by liquid chromatography, is in the range of 0.9 to 3.0, the total concentration of NaCl and Na2SO4 contained in said water-soluble dye is 3.0 wt. % or less; and the concentration of Ca contained in said water-soluble dye is 120 ppm or less;

(2) said water-soluble organic solvent is a mixture consisting essentially of (c) glycerin and (d) at least one glycol selected from the group consisting of ethylene glycol, diethylene glycol, triethylene glycol, tetraethylene glycol and plyethylene glycol having an average molecular weight in the range of from 200 to 400, the weight ratio of (c):(d) being in the range of 1:1 to 1:5, and the concentration of said water-soluble organic solvent in said aqueous ink is in the range of from 10 wt. % to 30 wt. %; and (3) the surface tension of said aqueous ink at least 50 dynes/cm.

2. An aqueous ink for ink-jet printing as claimed in claim 1, wherein the concentration of said water-soluble dye in said aqueous ink is in the range of 1.5 wt. % to 4.0 wt. %.

3. An aqueous ink for ink-jet printing as claimed in claim 1, wherein the pH of said aqueous ink is in the range of 9.0 to 11.0 at room temperature.

4. An aqueous ink for ink-jet printing as claimed in claim 1, wherein said water-soluble organic solvent further contains at least one solvent selected from the group consisting of polypropylene glycol, ethylene glycol monobutyl ether, diethylene glycol monobutyl ether, triethylene glycol monomethyl ether, triethylene glycol monoethyl ether, triethanolamine, N-methyl-2-pyrrolidone, 2-pyrrolidone, valerolactone and caprolactone.

5. An aqueous ink for ink-jet printing as claimed in claim 1, further comprising a pH adjustment agent selected from the group consisting of diethanolamine, triethanolamine, alkali metal hydroxides, alkali metal carbonates and ammonium hydroxide.

6. An aqueous ink for ink-jet printing as claimed in claim 1, further comprising a water-soluble resin for adjusting the viscosity of the ink.

7. An aqueous ink for ink-jet printing as claimed in claim 1, further comprising a rust preventing agent selected from the group consisting of sodium thiosulfate and ammonium thioglycolate.

8. An aqueous ink for ink-jet printing consisting essentially of an aqueous solution of from 1.5 to 4.0 wt. % of a water-soluble dye, from 10 to 30 wt. % of a water-soluble organic solvent, an effective amount of a water-soluble preservative for aqueous inks, and the balance is essentially water, wherein
   (1) said water-soluble dye is a mixture of (a) a compound having the formula I, and (b) a compound having the formula II, a compound having the formula III or a mixture of compounds having the formulas II and III,

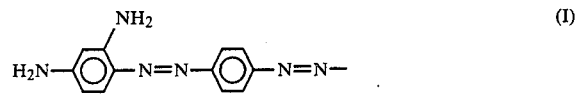

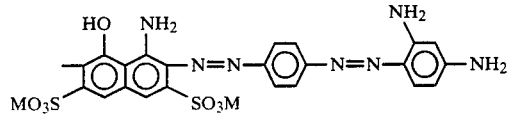

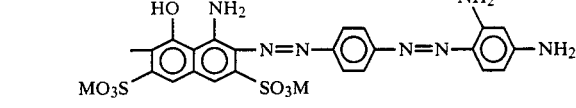

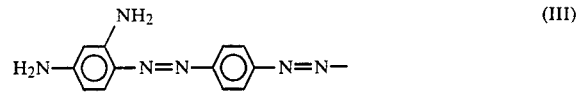

-continued

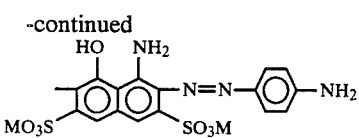

wherein M is an alkali metal; the peak ratio of (a)/(b) of said water-soluble dye, measured by liquid chromatography, is in the range of 0.9 to 3.0; the total concentration of NaCl and $Na_2SO_4$ contained in said water-soluble dye is 3.0 wt. % or less; and the concentration of Ca contained in said water-soluble dye is 120 ppm or less;

(2) said water-soluble organic solvent is a mixture consisting essentially of (c) glycerin and (d) at least one glycol selected from the group consisting of ethylene glycol, diethylene glycol and triethylene glycol, the weight ratio of (c):(d) being the range of 1:2 to 1:4; and (3) the surface tension of said aqueous ink at least 50 dynes/cm.

* * * * *